(12) United States Patent
Ivanov (10) Patent No.: US 11,481,126 B2
(45) Date of Patent: Oct. 25, 2022

(54) MEMORY DEVICE ERROR BASED ADAPTIVE REFRESH RATE SYSTEMS AND METHODS

(71) Applicant: MICRON TECHNOLOGY, INC., Boise, ID (US)

(72) Inventor: Ivan Iliev Ivanov, Steinhoering (DE)

(73) Assignee: Micron Technology, Inc., Boise, ID (US)

( * ) Notice: Subject to any disclaimer, the term of this patent is extended or adjusted under 35 U.S.C. 154(b) by 170 days.

(21) Appl. No.: 15/163,482

(22) Filed: May 24, 2016

(65) Prior Publication Data

US 2017/0344299 A1    Nov. 30, 2017

(51) Int. Cl.
    *G06F 11/10*      (2006.01)
    *G06F 3/06*      (2006.01)
    (Continued)

(52) U.S. Cl.
    CPC ........... *G06F 3/0634* (2013.01); *B60W 10/04* (2013.01); *B60W 10/18* (2013.01); *B60W 10/20* (2013.01);
    (Continued)

(58) Field of Classification Search
    CPC .. G06F 3/0634; G06F 11/1048; G06F 3/0619; G06F 3/0659; G06F 3/0673;
    (Continued)

(56) References Cited

U.S. PATENT DOCUMENTS

| | | | |
|---|---|---|---|
| 6,088,662 A * | 7/2000 | Flinsbaugh | ............ G01K 1/026 360/27 |
| 8,170,750 B2 | 5/2012 | Katrak et al. | |

(Continued)

FOREIGN PATENT DOCUMENTS

| | | |
|---|---|---|
| CN | 1346571 A | 4/2002 |
| CN | 101647004 A | 2/2010 |

(Continued)

OTHER PUBLICATIONS

PCT International Search Report & Written Opinion for PCT Application No. PCT/US2017/032264 dated Jul. 24, 2017; 19 Pages.

(Continued)

*Primary Examiner* — Donald J Wallace
*Assistant Examiner* — Daniel M. Robert
(74) *Attorney, Agent, or Firm* — Fletcher Yoder, P.C.

(57) ABSTRACT

One embodiment describes an automation system including a sensor that determines operational parameters of the automation system; one or more actuators that perform control actions during operation of the automation system; and a control system communicatively coupled to the sensor and the one or more actuators. The control system includes memory that stores the operational parameters; determines occurrence of memory errors in data stored in the memory; determines error parameters that indicate characteristics of the memory errors; determines error-corrected data by correcting the memory errors based at least in part on the error parameters; adaptively adjusts a refresh rate used to refresh stored data in the memory based at least in part on the error parameters; and determines control commands instructing the one or more actuators to perform the control actions by processing the error-corrected data.

29 Claims, 4 Drawing Sheets

(51) Int. Cl.

| | |
|---|---|
| *B60W 10/04* | (2006.01) |
| *B60W 10/18* | (2012.01) |
| *B60W 10/20* | (2006.01) |
| *B60W 30/09* | (2012.01) |
| *B60W 30/18* | (2012.01) |
| *B60W 50/00* | (2006.01) |
| *B60W 50/06* | (2006.01) |
| *G05D 1/00* | (2006.01) |
| *G06F 11/07* | (2006.01) |

(52) U.S. Cl.
CPC ............ *B60W 30/09* (2013.01); *B60W 30/18* (2013.01); *B60W 50/0098* (2013.01); *B60W 50/06* (2013.01); *G05D 1/0088* (2013.01); *G06F 3/0619* (2013.01); *G06F 3/0659* (2013.01); *G06F 3/0673* (2013.01); *G06F 11/073* (2013.01); *G06F 11/079* (2013.01); *G06F 11/1048* (2013.01); *B60W 2050/0014* (2013.01); *B60W 2556/00* (2020.02); *G06F 2212/173* (2013.01)

(58) Field of Classification Search
CPC ................. G06F 11/073; G06F 11/079; G06F 2212/173; B60W 10/04; B60W 10/18; B60W 10/20; B60W 30/09; B60W 30/18; B60W 50/0098; B60W 50/06; B60W 2256/00; B60W 2050/0014; G05D 1/0088; G05B 19/045; G05B 23/02
See application file for complete search history.

(56) References Cited

U.S. PATENT DOCUMENTS

| | | | |
|---|---|---|---|
| 8,255,740 B2 | 8/2012 | Kamath et al. | |
| 8,255,772 B1 | 8/2012 | Foley | |
| 8,934,284 B2* | 1/2015 | Patapoutian | G11C 13/004 365/148 |
| 9,263,136 B1* | 2/2016 | Zhao | G11C 11/5628 |
| 9,978,461 B2* | 5/2018 | Zorn | G06F 11/1048 |
| 2003/0046630 A1 | 3/2003 | Hilbert | |
| 2006/0195755 A1* | 8/2006 | Brown | H03M 13/00 |
| 2006/0236162 A1 | 10/2006 | Zeighami et al. | |
| 2008/0306654 A1* | 12/2008 | Katrak | B62D 5/008 701/41 |
| 2010/0306598 A1 | 12/2010 | Ackaret et al. | |
| 2011/0035545 A1* | 2/2011 | Sutardja | G06F 11/1064 711/108 |
| 2011/0231697 A1 | 9/2011 | Berke et al. | |
| 2012/0011409 A1 | 1/2012 | Renick | |
| 2012/0036317 A1* | 2/2012 | Torii | G06F 16/90339 711/108 |
| 2012/0079314 A1 | 3/2012 | Kamath et al. | |
| 2012/0151299 A1* | 6/2012 | Suh | G11C 29/50016 714/764 |
| 2013/0055046 A1* | 2/2013 | Blodgett | G06F 11/1417 714/764 |
| 2014/0040683 A1 | 2/2014 | Roohparvar et al. | |
| 2014/0219003 A1* | 8/2014 | Ebsen | G11C 13/0035 365/148 |
| 2014/0245108 A1* | 8/2014 | Gaertner | G06F 11/1048 714/773 |
| 2015/0149817 A1* | 5/2015 | Strasser | G06F 12/0246 714/6.11 |
| 2015/0331732 A1* | 11/2015 | Giovannini | G11C 11/406 714/704 |
| 2016/0180959 A1* | 6/2016 | Darragh | G06F 11/079 365/185.09 |
| 2016/0224412 A1* | 8/2016 | Healy | G06F 11/0793 |
| 2017/0024303 A1* | 1/2017 | Christopher | G06F 11/366 |
| 2017/0038805 A1* | 2/2017 | Chun | G06F 3/0604 |

FOREIGN PATENT DOCUMENTS

| | | |
|---|---|---|
| CN | 104575589 A | 4/2015 |
| CN | 104637530 A | 5/2015 |
| WO | 2008018989 A2 | 2/2008 |
| WO | 2014120228 A1 | 8/2014 |

OTHER PUBLICATIONS

European Search Report dated Nov. 27, 2019; EP Application No. 17803284.3.
Office Action for Chinese Application No. 201780031644.9 dated Nov. 4, 2020, with English translation; 41 pages.
Office Action for Chinese Application No. 201780031644.9 dated Jun. 28, 2021, with English translation; 50 pages.
Zhang, Tie-Fei et al., "Exploiting Memory Access Patterns of Programs for Energy-Efficient Memory System Techniques," Journal of Software, Feb. 15, 2014, 13 pages.
Office Action for CN Application No. 201780031644.9 dated Nov. 26, 2021, with English translation, 9 pages.

* cited by examiner

MEMORY DEVICE ERROR BASED ADAPTIVE REFRESH RATE SYSTEMS AND METHODS

BACKGROUND

1. Field of the Invention

The present disclosure generally relates to control systems and, more particularly, to memory devices used in the control systems.

2. Description of the Related Art

Generally, a control system may control operation of an automation system, such as an industrial plant, one or more machines, or an automotive vehicle. For example, the control system may determine operational parameters of the automation system and/or receive user inputs. Additionally, the control system may process the operation parameters and/or user inputs to determine control commands, which instruct the automation system to perform corresponding control actions.

To facilitate controlling operation, the control system may include a processing device and a memory device that stores data, such as the operational parameters, the user inputs, and/or instructions executable by the processing device. Depending on implementation, the memory device may include one or more different types of memory. For example, the memory device may include non-volatile memory, such as read-only-memory (ROM), and/or volatile memory, such as dynamic random-access memory (DRAM).

In some instances, memory errors may affect the value of data stored in the memory device. For example, a fixed memory error may cause the value of a data bit to flip (e.g., from "1" to "0" or vice versa) due to gradual decrease of voltage stored in a corresponding storage capacitor of the memory device (e.g., DRAM). Since the control system operates based at least in part on data stored in the memory device, memory errors present in data output from the memory device may affect operation of the control system and, thus, operation of the automation system.

DETAILED DESCRIPTION OF SPECIFIC EMBODIMENTS

As mentioned above, a control system may include a processing device and a memory device to facilitate controlling operation of an automation system, such as a manufacturing system, a turbine system, one or more machines, a factory, a plant, an airplane, an automotive vehicle or the like. More specifically, the processing device may perform operations based at least in part on data, such as operational parameters of the automation system, sensor data, user inputs, and/or executable instructions, stored in the memory device. For example, to determine control commands, the processing device may process operational parameters of the automation system stored in the memory device by executing instructions, which may also be stored in the memory device.

Depending on implementation, the memory device may utilize one or more different types of memory. For example, the memory device may include non-volatile memory, such as read-only memory (ROM), hard disk drives, flash memory, solid-state drives, and/or the like. Additionally or alternatively the memory device may include volatile memory, such as static random-access memory (SRAM), dynamic random-access memory (DRAM), and/or the like.

In some embodiments, the memory device (e.g., DRAM) may store data using storage capacitors. Specifically, the value (e.g., "0" or "1") of a data bit may be indicated by voltage stored in a corresponding storage capacitor. For example, the storage capacitor may indicate a "1" when its voltage is greater than a threshold and a "0" when its value is less than the threshold. Accordingly, to write data to the memory device, electrical power may be applied to charge one or more storage capacitors to an appropriate voltage to indicate each bit of the data. Additionally, to read the data from the memory device, the voltage stored in each of the corresponding storage capacitors may be determined (e.g., measured).

However, memory errors may affect data output (e.g., read) from the memory device. For example, a soft-bit memory error may be caused by a neutron colliding with a storage capacitor, thereby transferring electrical energy that causes voltage of the storage capacitor and, thus, indicated value of the corresponding data bit to flip (e.g., from "1" to "0" or vice versa). Additionally, a system memory error may be caused by faults in the control system itself, for example, in the memory device and/or a communication channel from the memory device.

Furthermore, a fixed memory error may be caused by gradual decrease of voltage stored in storage capacitors of the memory device (e.g., DRAM) over time. For example, a fixed memory error may occur when voltage of a storage capacitor decreases from above a threshold, above which the storage capacitor indicates a value of "1," to below the threshold, thereby flipping the indicated value to "0." Since the control system may control operation of the automation system based at least in part on data read from the memory device, operation of the control system and, thus, the automation system may be affected by occurrence of memory errors. In other words, occurrence of memory errors may affect operational reliability of the control system and, thus, the automation system.

Regulatory bodies often set standards that govern operational reliability of automation systems. For example, the International Organization for Standardization (ISO) provides international standards governing operational reliability of automotive vehicles in ISO 26262. Specifically, ISO 26262 provides an operational reliability classification scheme, which from lowest to highest includes Automotive Safety Integrity Level (ASIL) A, ASIL B, ASIL C, and ASIL D.

In some instances, the governing operational reliability standard (e.g., ASIL classification) may vary based on amount of control the control system has on operation of the automotive vehicle. For example, in a traditional automotive vehicle, the control system may control operation of the automotive vehicle primarily based on user direction, which may be received as user inputs via a steering wheel, gas pedal, brake pedal, and/or buttons. Since controlled primarily based on user direction, the operational reliability standard governing traditional automotive vehicles may be lower, for example, ASIL A or ASIL B.

On the other hand, in more advanced vehicles, the control system may autonomously control operation of at least a portion of the automotive vehicle with limited or no user direction. For example, when implementing an Advanced Driver Assistance System (ADAS), the control system may determine operational parameters, such as distance from surrounding objects, direction of the automotive vehicle, and/or speed of the automotive vehicle, from the memory device and autonomously instruct the automotive vehicle to apply the brakes when otherwise expected to contact the surrounding objects. Additionally, when implementing an autonomous driving system, the control system may determine operational parameters, such as a current location of the automotive vehicle, target destination of the automotive vehicle, a route from the current location to the target destination, and/or operational constraints along the route, from the memory device and autonomously control operation of the automotive vehicle to travel from the current location to the target destination. As such, the operational reliability standard governing automotive vehicles, in which the control system autonomously controls at least a portion of operation, may be higher, for example, ASIL C or ASIL D.

To facilitate meeting higher operational reliability standards, likelihood and/or number of memory errors occurring in data output (e.g., read) from the memory device may be reduced. For example, likelihood and/or number of fixed memory errors (e.g., resulting from gradual decrease in stored voltage) occurring may be reduced by refreshing (e.g., rewriting stored data) the memory device (e.g., DRAM). In fact, likelihood and/or number of fixed memory errors occurring in the memory device may be reduced by increasing the refresh rate.

However, refresh rate may also affect performance of the memory device. For example, as described above, data may be stored in (e.g., written to) the memory device by applying electrical power to corresponding storage capacitors. As such, refreshing (e.g., rewriting) data stored in the memory device may consume electrical power.

In some embodiments, power consumption may affect operational efficiency of the control system and, thus, the automation system. For example, in an automotive vehicle (e.g., an automation system), electrical power used to write data to the memory device may be supplied from an electrical energy source (e.g., a battery), which may also supply electrical power to an electric motor in an electric-powered automotive vehicle and/or be charged by a mechanical energy source (e.g., an internal combustion engine) in a gas-powered automotive vehicle. As such, refresh rate of the memory device may affect range and/or fuel economy of the automotive vehicle.

Additionally, as described above, data may be output (e.g., read) from the memory device by determining voltage stored in corresponding storage capacitors. In some embodiments, the same path (e.g., data line) may be used to read data from a storage capacitor as used to write data to the storage capacitor and/or other storage capacitors (e.g., in the same column). Thus, in such an embodiment, the memory device may be unable to simultaneously read and write data. As such, refreshing (e.g., rewriting) data may affect availability (e.g., bandwidth) of the memory device to output data.

In some embodiments, availability of the memory device may affect operational reliability of the control system and, thus, the automation system. For example, in an automotive vehicle (e.g., an automation system), the control system may autonomously control operation of at least a portion of the automotive vehicle based on operational parameters retrieved from the memory device. Thus, when the memory device is refreshing, the control system may be unable to retrieve the operational parameters, thereby delaying ability of the control system to make adjustments to operation of the automotive vehicle.

In other words, refresh rate of the memory device may present tradeoffs between occurrence of fixed memory errors, power consumption, and/or memory device availability (e.g., bandwidth). For example, increasing refresh rate may facilitate reducing the number of fixed memory errors, but also increase power consumption of the memory device and reduce availability of the memory device. On the other hand, decreasing refresh rate may increase the number of fixed memory errors, but also reduce power consumption of the memory device and increase availability of the memory device. Moreover, in some instances, occurrence of fixed memory errors may be affected by external (e.g., environmental) conditions. For example, the number and/or likelihood of fixed errors occurring may increase as temperature of the memory device increases.

Accordingly, the present disclosure provides techniques to improve operation of an automation system by adaptively controlling (e.g., adjusting) refresh rate of a memory device (e.g., DRAM) in a control system, for example, based on environmental conditions and/or correctability of subsequently expected memory errors. As described above, operational reliability of the control system and, thus, the automation system may be affected by occurrence of memory errors. To facilitate reducing the affect memory errors may have, the control system may perform error detection and correction.

For example, when data is read from the memory device, the control system may perform an error detection process to determine error parameters, such as location of each memory error and/or error type (e.g., soft-bit memory error, fixed memory error, and system memory error) of each memory error. Based at least in part on the error parameters, the control system may then perform an error correction process to correct the detected memory errors before performing operations based on the data. However, in some embodiments, capabilities of the error correction process to correct memory errors may be limited, for example, to a maximum number of correctable memory errors.

As described above, refresh rate may affect likelihood and/or number of fixed memory errors occurring in data output (e.g., read) from the memory device (e.g., DRAM). For example, increasing refresh rate may facilitate reducing number of fixed memory errors and, thus, total number of memory errors occurring in the output data. In other words, refreshing the memory device may be used to supplement the error correction process, which may facilitate improving operational reliability of the control system and/or the automation system.

In fact, in some embodiments, the control system may adaptively adjust refresh rate of the memory device (e.g., DRAM) based at least in part on whether the error correction process is expected to be capable of correcting memory errors in data subsequently output from the memory device. To facilitate, in some embodiments, the control system may determine the number of memory errors expected to occur in the subsequently output data. In some embodiments, the control system may determine expected number of memory errors based at least in part on the error parameters, which may indicate number of memory errors that were present in previously output data, and/or environmental conditions, such as temperature of the memory device.

When the expected number of memory errors is greater than an error threshold, the control system may determine that likelihood of the error correction process being able to sufficiently correct the memory errors in subsequently output data is lower. As such, the control system may increase refresh rate of the memory device (e.g., DRAM) to facilitate reducing the likelihood and/or number of fixed memory errors and, thus, memory errors occurring in output data. On the other hand, when the number of expected memory errors is not greater than the error correction threshold, the control system may determine that likelihood of the error correction process being able to sufficiently correct the memory errors in subsequently output data is higher. As such, the control system may maintain or even lower refresh rate of the memory device (e.g., DRAM), which may facilitate reducing power consumption and/or improve memory device availability. In this manner, the control system may adaptively control (e.g., adjust) refresh rate of the memory device to improve operational reliability and/or operational efficiency of the control system and/or the automation system.

Figure 1:
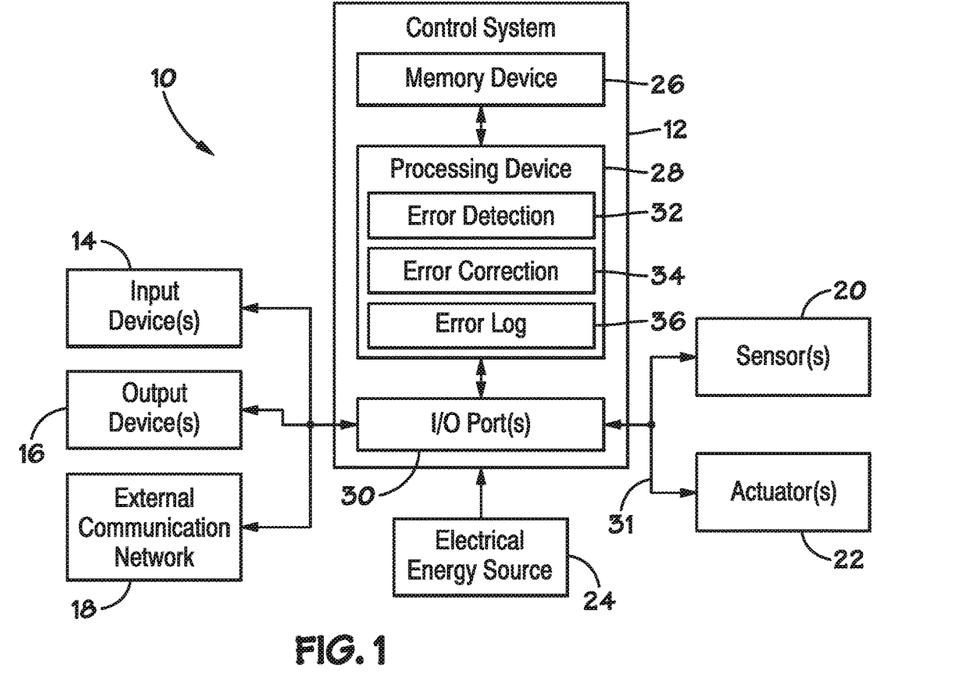
FIG. 1 is a block diagram of an automation system with a control system, in accordance with an embodiment.

To help illustrate, one embodiment of an automation system 10 is shown in FIG. 1. As described above, the automation system 10 may be any suitable automation system, such as a manufacturing system, a turbine system, one or more machines, a factory, a plant, an airplane, an automotive vehicle, and/or the like. It should be noted that FIG. 1 is merely one example of a particular implementation intended to illustrate types of components that may be present in the automation system 10. For example, in the depicted embodiment, the components include a control system 12, one or more input devices 14, one or more output devices 16, a communication network 18, one or more sensors 20, one or more actuators 22, and an electrical energy source 24.

As described above, the control system 12 may control operation of the automation system 10. To facilitate, the control system 12 may include a memory device 26, a processing device 28, and one or more input/output (I/O) ports 30. Additionally, to enable operation, the control system 12 may be electrically coupled to the electrical energy source 24. In this manner, the control system 12 may operate using electrical power supplied from the electrical energy source 24. In some embodiments, the electrical energy source 24 may include an energy storage device, such as a battery, and/or an electrical generator, such as an alternator that converts mechanical energy into electrical power.

Specifically, in the control system 12, the electrical power may be used to power the memory device 26, the processing device 28, and/or the I/O ports 30. For example, using the electrical power, the memory device 26 may store and/or output data, such as user inputs received via the input devices 14, sensor data received via the sensors 20, information communicated to the output devices 16, control commands communicated to the actuators 22, data to be processed by the processing device 28, and/or instructions executable by the processing device 28. Thus, in some embodiments, the memory device 26 may include a tangible, non-transitory, computer-readable medium, for example, volatile memory, such as dynamic random access memory (DRAM) or static random access memory (SRAM), and/or non-volatile memory, such as read only memory (ROM), rewritable flash memory, hard drives, or optical discs.

Additionally, using the electrical power, the processing device 28 may perform operations based at least in part on the data stored in the memory device 26. For example, the processing device 28 may execute instructions stored in the memory device 26 to determine information communicated to the output devices 16 and/or control commands communicated to the actuators 22. Additionally, the processing device 28 may process operational parameters of the automation system 10, sensor data, and/or user inputs stored in the memory device 26.

Furthermore, as depicted, the I/O ports 30 may communicatively couple the control system 12 to other components of the automation system 10, such as the input devices 14, the output devices 16, the communication network 18, the one or more sensors 20, and/or the one or more actuators 22. In some embodiments, the input devices 14 and/or the output device 16 may enable a user (e.g., operator) to interact with the control system 12. For example, the input devices 14 may include a buttons, a keyboard, a mouse, a trackpad, a touch-sensitive, and/or the like, which enables the user to provide user inputs (e.g., directions) to the control system 12. Additionally, the output devices 16 may include a display, speakers, and/or the like, which enables the control system 12 to provide information related to operation of the automation system 10 to the user.

Furthermore, the external communication network 18 may enable the control system 12 to communicate with external (e.g., remote) electronic devices. For example, the external communication network 18 may include a personal area network (PAN), such as a Bluetooth network, a local area network (LAN), such as an 802.11x Wi-Fi network, and/or a wide area network (WAN), such as a 4G or LTE cellular network. Thus, in some embodiments, the external communication network 18 may enable the control system 12 to receive user inputs from and/or provide information related to operation of the automation system 10 to external electronic devices and/or users of the external electronic devices.

To facilitate determining information related to operation of the automation system 10, the control system 12 may receive sensor data from the one or more sensors 20, for example, via an internal communication network 31. In some embodiments, the sensors 20 may measure operational parameters of the automation system 10 and communicate the operational parameters to the control system 12 as sensor data, which may be stored in the memory device 26. For example, the sensors 20 may include a temperature sensor that measures temperature of the control system 12 and/or temperature of the memory device 26.

To control operation of the automation system 10, the control system 12 may communicate control commands to actuators 22 instructing the actuators 22 to perform a control action, for example, via the internal communication network 31. In some embodiments, actuators 22 may include one or more motors, engines, generators, alternators, compressors, turbines, steering mechanisms, braking mechanisms, and/or the like. Based at least in part on the control commands, the actuators 22 may perform a control action that adjusts or maintains operation of the automation system 10.

Figure 2:
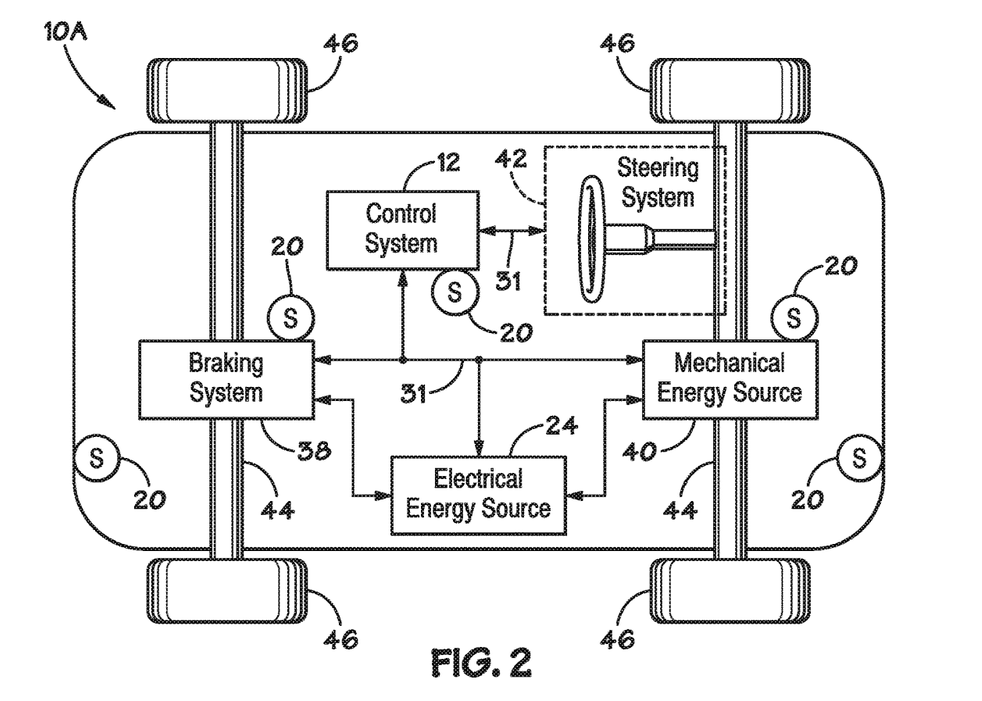
FIG. 2 is a schematic diagram of an automotive vehicle using the control system of FIG. 1, in accordance with an embodiment.

To help illustrate, one example of an automation system 10, specifically an automotive vehicle 10A, is shown in FIG. 2. It should be appreciated that the automotive vehicle 10A is merely intended to be illustrative and not limiting. As described above, the techniques described herein may be implemented in various other types of automation systems 10, such as a factory, one or more machines, or the like. Moreover, it should be noted that the automotive vehicle 10A shown in FIG. 2 is merely one example of a particular implementation intended to illustrate the types of components that may be present.

As described above, the internal communication network 31 may communicatively couple the control system 12 with one or more actuators 22 and/or sensors 20. In some embodiments, the internal communication network 31 may include a controller area network (CAN), a local interconnect network (LIN), and/or the like. In this manner, the control system 12 may receive sensor data (e.g., operational parameters of the automotive vehicle 10A) from the sensors 20 and store the sensor data in the memory device 26. In the automotive vehicle 10A, the sensors 20 may include temperature sensors that determine temperature of a portion of the automotive vehicle 10A, a global positioning system (GPS) sensor that determines current location of the automotive vehicle 10A, a proximity sensor that determines distance of the automotive vehicle 10A from surrounding objects, and/or the like.

Additionally, in this manner, the control system 12 may communicate control commands to actuators 22 included in the electrical energy source 24, a braking system 38, a mechanical energy source 40, and/or a steering system 42. For example, the control system 12 may instruct the mechanical energy source 40 to increase speed of the automotive vehicle 10A by actuating (e.g., rotating) an axel 44 and/or a tire 46 coupled to the axel 44. In some embodiments, the mechanical energy source 40 may include an electric motor and/or an internal combustion engine. To increase speed, the control system 12 may instruct the automotive vehicle 10A to increase fuel supplied to the mechanical energy source 40. For example, the control system 12 may instruct the automotive vehicle 10A to increase gasoline supplied to the internal combustion engine and/or the electrical energy source 24 to increase electrical power supplied to the electric motor.

Additionally, in some embodiments, the mechanical energy source 40 may include an electrical generator, such as an alternator, that converts mechanical energy into electrical energy. In this manner, the electrical energy source 24 may capture the electrical energy, which may subsequently be supplied to electrical components of the automotive vehicle 10A, such as the control system 12, a heating, ventilation, and air conditioning (HVAC) system, a vehicle console, an electric motor, or the like. Thus, in such embodiments, the control system 12 may instruct the mechanical energy source 40 when to use the mechanical energy to propel the automotive vehicle 10A and when to convert the mechanical energy into electrical power supplied to the electrical energy source 24.

Furthermore, the control system 12 may instruct the braking system 38 to reduce speed of the automotive vehicle 10A by resisting actuation (e.g., rotation) of an axel 44 and/or a tire 46 coupled to the axel 44. In some embodiments, the braking system 38 may be a frictional braking system and/or a regenerative braking system. When utilizing frictional braking to decrease speed, the control system 12 may instruct the braking system 38 to apply a mechanical component (e.g., a brake pad) to an axel 44, thereby producing friction that converts mechanical energy from rotation of the axel 44 and/or tire 46 coupled to the axel 44 into heat.

When utilizing regenerative braking to decrease speed, the control system 12 may instruct a regenerative braking system to connect an electrical generator to an axel 44, thereby converting mechanical energy from rotation of the axel 44 and/or tires 46 coupled to the axel 44 into electrical energy. In other words, when utilizing regenerative braking, the braking system 38 may convert mechanical energy into electrical power supplied to the electrical energy source 24. In this manner, the electrical energy source 24 may capture the electrical energy, which may subsequently be supplied to electrical components of the automotive vehicle 10A, The control system 12 may also instruct the steering system 42 to adjust the direction the automotive vehicle 10A is traveling by adjusting angle of an axel 44 and/or tires 46 coupled to the axel 44. In some embodiments, the steering system 42 may include a steering wheel, a steering column, and/or a steering linkage. To adjust travel direction, the control system 12 may instruct the steering system 42 to actuate a steering linkage coupled to the tires 46, thereby changing angle of the tires 46.

As described above, in some embodiments, the control system 12 may control operation of the automation system 10 based at least in part on user inputs. For example, the control system 12 may instruct the mechanical energy source 40 to increase speed of the automotive vehicle 10A when a gas pedal (e.g., an input device 14) is actuated. Additionally, the control system 12 may instruct the braking system 38 to reduce speed of the automotive vehicle 10A when a brake pedal (e.g., an input device 14) is actuated. Furthermore, the control system 12 may instruct the steering system 42 to adjust direction of the automotive vehicle 10A when a steering wheel (e.g., an input device 14) is actuated.

In other embodiments, the control system 12 may autonomously (e.g., with no or limited user direction) control operation of at least a portion of the automation system 10 based on operational parameters of the automation system 10. For example, the control system 12 may autonomously instruct the braking system 38 to reduce speed of the automotive vehicle 10A based at least in part on distance of the automotive vehicle 10A from surrounding objects, direction of the automotive vehicle 10A, and/or speed of the automotive vehicle 10A. Additionally or alternatively, the control system 12 may autonomously instruct the mechanical energy source 40, the electrical energy source 24, the braking system 38, and/or the steering system 42 to operate such that the automotive vehicle 10A travels a determined route based at least in part on a current location of the automotive vehicle 10A, a target destination of the automotive vehicle 10A, and/or operational constraints (e.g., speed limit, traffic, and/or surrounding objects) along the route.

Returning to FIG. 1, as described above, the operational parameters and/or instructions executable by the control system 12 may be stored in the memory device 26. However, memory errors may occur in data stored in the memory device 26 and, thus, affect operation of the control system 12 and/or the automation system 10. For example, when the memory device 26 includes DRAM, a fixed memory error may occur when gradual decrease in voltage of a storage capacitor causes the indicated value of a corresponding data bit to flip (e.g., from "1" to "0" or vice versa). As described above, in some embodiments, refreshing the memory device 26 (e.g., DRAM) may facilitate reducing likelihood and/or number of fixed memory errors that occur in the memory device 26.

In addition to fixed memory errors, in some instances, other types of memory errors may occur in the memory device 26. For example, a soft-bit memory error may occur when a neutron hits a storage capacitor, thereby changing voltage of the storage capacitor in a manner that causes the indicated value of a corresponding data bit to flip (e.g., from "1" to "0" or vice versa). Additionally, a system memory error may occur due to faults in the control system 12, such as, a faulty communication channel (e.g., a data bus) from the memory device 26, a faulty storage capacitor, and/or faulty insulation.

To reduce likelihood of memory errors affecting operational reliability, the processing device 28 may perform an error detection process 32 and/or an error correction process 34. For example, the processing device 28 may perform the error detection process 32 and the error correction process each time data is read from the memory device 26. By performing the error detection process 32, the control system 12 may determine characteristics (e.g., error parameters) of memory errors occurring in the read data, such as location of each memory error and/or error type (e.g., soft-bit memory error, fixed memory error, and system memory error) of each memory error. In some embodiments, the processing device 28 may store the determined memory parameters in an error log 36.

Based at least in part on the error parameters, the processing device 28 may perform the error correction process 34 to correct memory errors detected in the read data. For example, when the error parameters indicate that the value of a bit in the read data is affected by a memory error, the error correction process 34 may adjust the value of the bit accordingly (e.g., from "0" to "1" or vice versa). As such, the processing device 28 may retrieve the error parameters from the error log 36. After performing the error correction process 34, the processing device 28 may perform operations based on error-corrected data. By operating the control system 12 in this manner, likelihood of memory errors affecting operation of the control system 12 and/or the automation system 10 may be reduced, thereby improving operational reliability.

Figure 3:
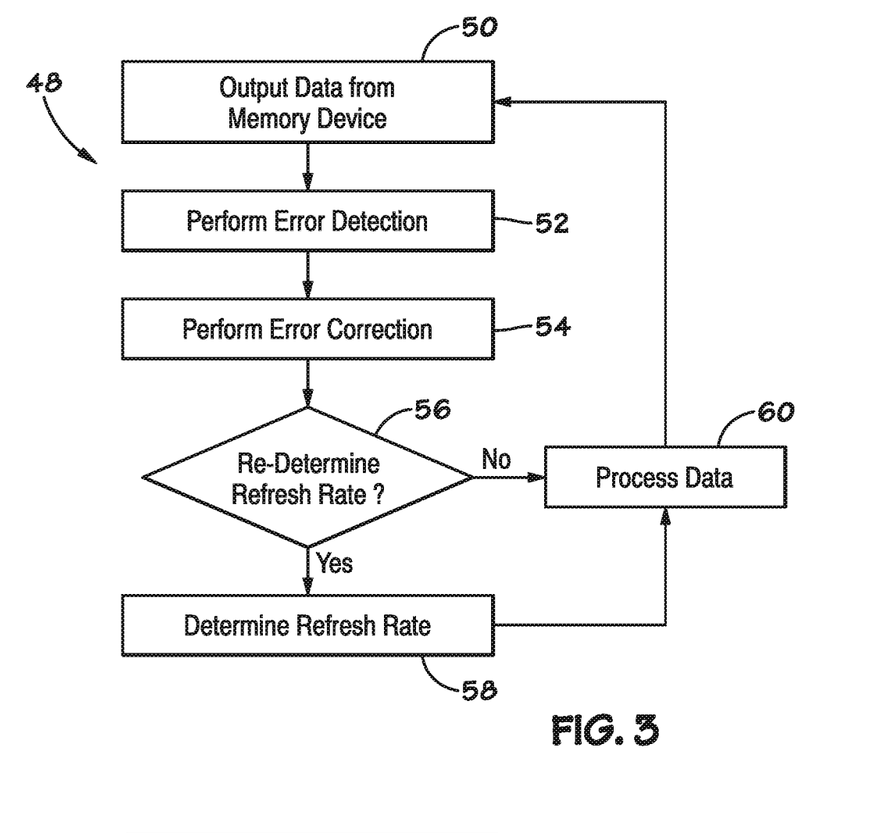
FIG. 3 is a flow diagram of a process for operating the control system of FIG. 1, in accordance with an embodiment.

To help illustrate, one embodiment of a process 48 for operating a control system 12 is described in FIG. 3. Generally, the process 48 includes outputting data from a memory device (process block 50), performing error detection (process block 52), performing error correction (process block 54), determining whether to re-determine refresh rate of the memory device (decision block 56), determining the refresh rate when the refresh rate is to be re-determined (process block 58), and processing the data output from the memory device (process block 60). In some embodiments, the process 48 may be implemented by executing instructions stored in a tangible non-transitory computer-readable mediums, such as the memory device 26, using processing circuitry, such as the processing device 28.

Accordingly, in some embodiments, the control system 12 may instruct the memory device 26 to output data stored at a target address in the memory device 26 (process block 50). In such embodiments, the memory device 26 may retrieve (e.g., read) stored data, for example, by determining voltage of storage capacitors at the target address. As described above, the stored data may include operational parameters of the automation system 10, sensor data, user inputs, and/or executable instructions. The memory device 26 may then communicate (e.g., output) the stored data to the processing device 28, for example, via a communication channel and/or a data bus.

In some embodiments, the memory device 26 may augment the stored data with error check data before outputting to the processing device 28. For example, the memory device 26 may make multiple copies (e.g., error check data) of the stored data and transmit the copies in series and/or parallel to the processing device 28. Additionally or alternatively, the memory device 26 may perform a hash function on the stored data to determine a hash function result (e.g., error check data), such as a parity bit, checksum bits, cyclic redundancy bits, a hash value, and/or the like, which may be concatenated and output with the stored data.

Additionally, the control system 12 may detect occurrence of memory errors in the output data by instructing the processing device 28 to perform the error detection process 32 (process block 52). As described above, by performing the error detection process 32, the processing device 28 may determine characteristics (e.g., errors parameters) of the detected memory errors. In some embodiments, the error parameters may include location of memory errors detected in the output data, error type (e.g., soft-bit memory error, fixed memory error, and system memory error) of each detected memory error, total number of detected memory errors, and/or number of each error type of memory error. Additionally, in some embodiments, the processing device 28 may store the error parameters in the error log 36.

Furthermore, in some embodiments, the processing device 28 may perform the error detection process 32 based at least in part on the error check data included in the output data. For example, when the error check data includes a copy (e.g., repetition) of the stored data, the processing device 28 may compare the copy with another copy of the stored data received from the memory device 26. Additionally or alternatively, when the error check data includes a hash function result, the processing device 28 may perform the hash function on the stored data portion of the output data to determine another hash function result and compare the hash function results.

Based on results of the error detection process 32, the control system 12 may correct detected memory errors in the output data by instructing the processing device 28 to perform the error correction process 34 (process block 54). As described above, the processing device 28 may perform the error correction process 34 based at least in part on the error parameters, which may be stored in and, thus, retrieved from the error log 36. For example, based on location (e.g., an error parameter), the processing device 28 may adjust the value of a data bit at the indicated location. For digital data, the processing device 28 may adjust the value of the data bit from "1" to "0" or from "0" to "1."

Furthermore, the control system 12 may determine whether to re-determine refresh rate of the memory device 26 (decision block 56). As described above, when utilizing DRAM, refreshing the memory device 26 may affect performance of the memory device 26. For example, a higher refresh rate may facilitate reducing likelihood and/or number of fixed memory errors in the output data, but also increase power consumption and/or reduce availability (e.g., bandwidth) of the memory device 26. On the other hand, a lower refresh rate may increase likelihood and/or number of fixed memory errors in the output data, but also facilitate reducing power consumption of the memory device and increasing availability of the memory device. In other words, re-determining the refresh rate may facilitate rebalancing the affects refreshing the memory device 26 has on operation.

In some embodiments, the control system 12 may determine that the refresh rate of the memory device 26 should be re-determined each time the memory device 26 outputs data. However, as will be illustrated below, re-determining the refresh rate may be less than instantaneous and/or utilize computational resources. As such, in other embodiments, the control system 12 may periodically re-determine the refresh rate of the memory device 26.

Figure 4:
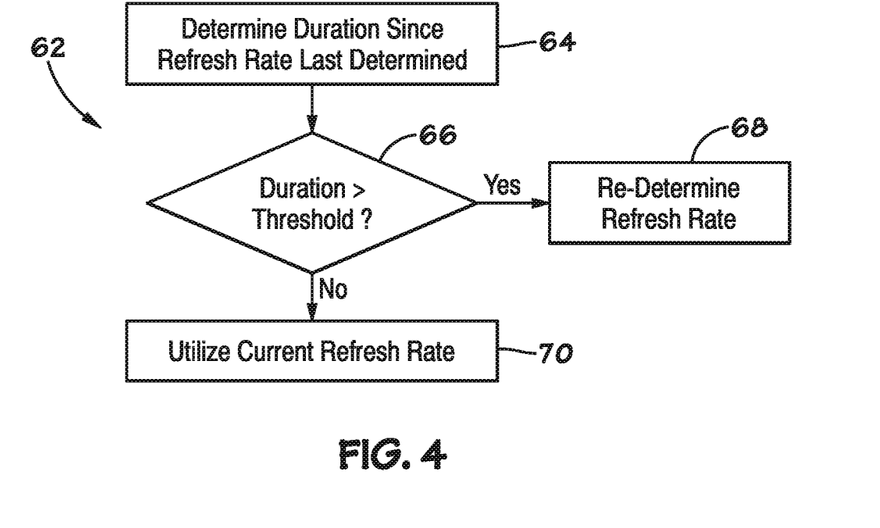
FIG. 4 is a flow diagram of a process for determining whether to re-determine refresh rate of a memory device in the control system of FIG. 1, in accordance with an embodiment.

To help illustrate, one embodiment of a process 62 for determining whether to re-determine the refresh rate of a memory device 26 is described in FIG. 4. Generally, the process 62 includes determining duration since refresh rate of a memory device was last determined (process block 64), determining whether the duration is greater than a refresh re-determination threshold (decision block 66), re-determining the refresh rate of the memory device when the duration is greater than the refresh re-determination threshold (process block 68), and utilizing a current refresh rate when the duration is not greater than the refresh re-determination threshold (process block 70). In some embodiments, the process 62 may be implemented by executing instructions stored in a tangible non-transitory computer-readable mediums, such as the memory device 26, using processing circuitry, such as the processing device 28.

Accordingly, in some embodiments, the control system 12 may determine duration since the refresh rate of the memory device 26 was last determined (process block 64). Depending on implementation, the control system 12 may track the duration using one or more metrics. For example, the control system 12 may track the duration based on fixed time, such as number of clock cycles. Additionally or alternatively, the control system 12 may track duration using relative time, such as number of times the memory device 26 outputs data.

The control system 12 may then determine whether the duration is greater than a refresh re-determination threshold (decision block 66). For example, the control system 12 may compare number of clock cycles that have passed since the refresh rate was last determined with a clock cycle refresh re-determination threshold (e.g., a specific number of clock cycles). Additionally or alternatively, the control system 12 may compare a number of times the memory device 26 has output data since the refresh rate was last determined with a memory output refresh re-determination threshold (e.g., specific number of memory outputs).

In other words, the refresh re-determination threshold may be set to govern how often refresh rate of the memory device 26 is re-determined. For example, when it is determined that the refresh rate should be re-determined more frequently, the refresh re-determination threshold may be lower. On the other hand, when it is determined that the refresh rate should be re-determined less frequently, the refresh re-determination threshold may be higher.

Figure 5:
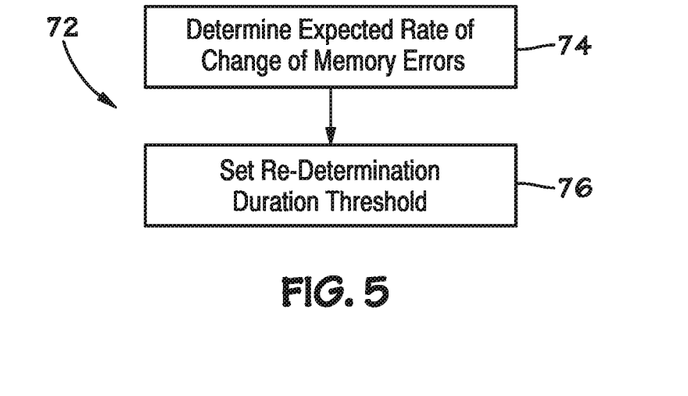
FIG. 5 is a flow diagram of a process for setting a refresh re-determination threshold used in the process of FIG. 4, in accordance with an embodiment.

To help illustrate, one embodiment of a process 72 for setting a refresh re-determination threshold is described in FIG. 5. Generally, the process 72 includes determining expected memory error increase rate in a memory device (process block 74) and setting a refresh re-determination threshold (process block 76). In some embodiments, the process 72 may be implemented by executing instructions stored in a tangible non-transitory computer-readable mediums, such as the memory device 26, using processing circuitry, such as the processing device 28. Furthermore, in some embodiments, the process 72 may be implemented by a manufacturer to predetermine the refresh re-determination threshold. Additionally or alternatively, in some embodiments, the process 72 may be implemented by the control system 12 to adaptively adjust the refresh re-determination threshold.

Accordingly, in such embodiments, the control system 12 may determine expected rate of change of likelihood and/or number of memory errors occurring in the memory device 26 (process block 74). In some embodiments, likelihood and/or number of memory errors may be affected by environmental conditions, such as temperature of the memory device 26 and/or surrounding radiation (e.g., neutron) activity. Accordingly, in some embodiments, the control system 12 may determine how environmental conditions are expected to change and expected rate of change (e.g., increase or decrease) in number of memory errors based at least in part on the expected changes in environmental conditions.

Based at least in part on the expected rate of change, the control system 12 may set the refresh re-determination threshold. For example, when likelihood and/or number of memory errors are expected to change gradually, the control system 12 may set a longer refresh re-determination threshold. On the other hand, when likelihood and/or number of memory errors are expected to change rapidly, the control system 12 may set a shorter refresh re-determination threshold. In some embodiments, the control system 12 may store the refresh re-determination threshold, for example, in the memory device 26.

Returning to the process 62 of FIG. 4, when the duration is not greater that than the refresh re-determination threshold, the control system 12 may determine that the refresh rate should not be re-determined and, thus, the memory device 26 should continue utilizing its current refresh rate (process block 70). On the other hand, when the duration is greater than the refresh re-determination threshold, the control system 12 may determine that the refresh rate of the memory device 26 should be re-determined (process block 68). Additionally or alternatively, even when the duration is not greater than the refresh re-determination threshold, the control system 12 may determine that the refresh rate should be re-determined based on external conditions, such as a user input and/or changes in environmental condition (e.g., increase in environmental temperature and/or radiation activity).

Returning to the process 48 of FIG. 3, when the refresh rate is not to be re-determined, the control system 12 may instruct the processing device 28 to perform operations based at least in part on the error-corrected data (process block 60). For example, when the error-corrected data includes operational parameters, the processing device 28 may process the operational parameters to determine control commands and/or information related to operation of the automation system 10, which may be presented to a user (e.g., operator) via an output device 16. Additionally, when the error-corrected data includes instructions, the processing device 28 may execute the instructions to determine the control commands and/or the information related to operation of the automation system 10. Since less likely to contain memory errors compared to the output data from the memory device 26, operating the control system 12 based at least in part on the error-corrected data may improve operational reliability of the control system 12 and/or the automation system 10.

On the other hand, when the refresh rate is to be re-determined, the control system 12 may determine the refresh rate to be used during subsequent operation of the memory device 26 (process block 58). As described above, refreshing the memory device 26 (e.g., DRAM) may facilitate reducing likelihood and/or number of fixed memory errors and, thus, be used to supplement the error correction process 34. Accordingly, in some embodiments, the control system 12 may adaptively adjust the refresh rate based at least in part on whether the error correction process is 34 expected to be capable of correcting memory errors occurring in subsequently output data from the memory device.

Figure 6:
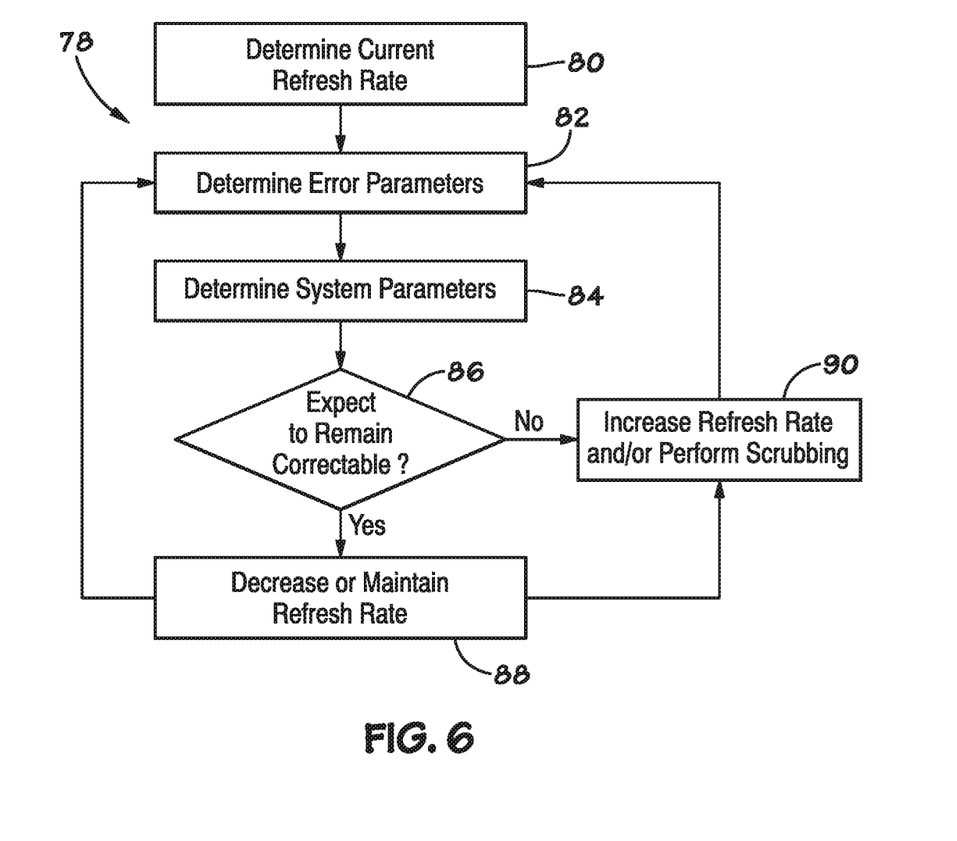
FIG. 6 is a flow diagram of a process for adaptively adjusting refresh rate of the memory device, in accordance with an embodiment.

To help illustrate, one embodiment of a process 78 for determining refresh rate of a memory device 26 is described in FIG. 6. Generally, the process 78 includes determining a current refresh rate (process block 80), determining error parameters (process block 82), determining system parameters (process block 84), determining whether subsequently occurring memory errors are expected to remain correctable (decision block 86), decreasing or maintaining the current refresh rate when expected to remain correctable (process block 88), and increasing the current refresh rate and/or performing a scrubbing operation when not expected to remain correctable (process block 90). In some embodiments, the process 78 may be implemented by executing instructions stored in a tangible non-transitory computer-readable mediums, such as the memory device 26, using processing circuitry, such as the processing device 28.

Accordingly, in some embodiments, the control system 12 may determine a current refresh rate of the memory device 26 (process block 80). In some embodiments, the current refresh rate may be a default refresh rate or an adjusted refresh rate different from the default refresh rate. For example, when the default refresh rate is 15.625 Hz (e.g., refresh once every 64 ms), the adjusted refresh rate may be less than 15.625 Hz (e.g., 13.89 Hz, 12.5 Hz, 11.36 Hz, 10.42 Hz, 9.52 Hz, 8.33 Hz, 1 Hz, etc.) or greater than 15.625 Hz (e.g., 16 Hz, 17.86 Hz, 20.83 Hz, 25 Hz, 31.25 Hz, 120 Hz, etc.). Additionally, in some embodiments, the current refresh rate may be stored in and, thus, retrieved from the memory device 26.

Additionally, the control system 12 may determine error parameters (process block 82). As described above, the error parameters may be stored in and, thus, retrieved from the error log 36. The control system 12 may also determine system parameters (process block 84). In some embodiments, the system parameters may include operational parameters of the automation system 10, such as temperature of the memory device 26, and/or environmental parameters, such as environmental temperature. Additionally, in some embodiments, the system parameters may be received from one or more sensors 20, one or more input devices 14, the external communication network 18, and/or the memory device 26.

Based at least in part on the error parameters and/or system parameters, the control system 12 may determine whether memory errors occurring in data subsequently output from the memory device is expected to be correctable, for example, by performing the error correction process 34 (decision block 86). When the memory errors are not expected to be correctable, the control system 12 may instruct the memory device 26 to increase refresh rate, which may facilitate reducing likelihood and/or number of fixed memory errors, and/or instruct the processing device 28 to perform a scrubbing operation, which may include reading stored data from the memory device 26, performing error correction on the data, and storing the error-correct data back into the memory device 26 (process block 90). On the other hand, when the memory errors are expected to be correctable, the control system 12 may instruct the memory device 26 to maintain its current refresh rate and/or reduce refresh rate, which may facilitate reducing power consumption and/or availability of the memory device 26 (process block 88).

Figure 7:
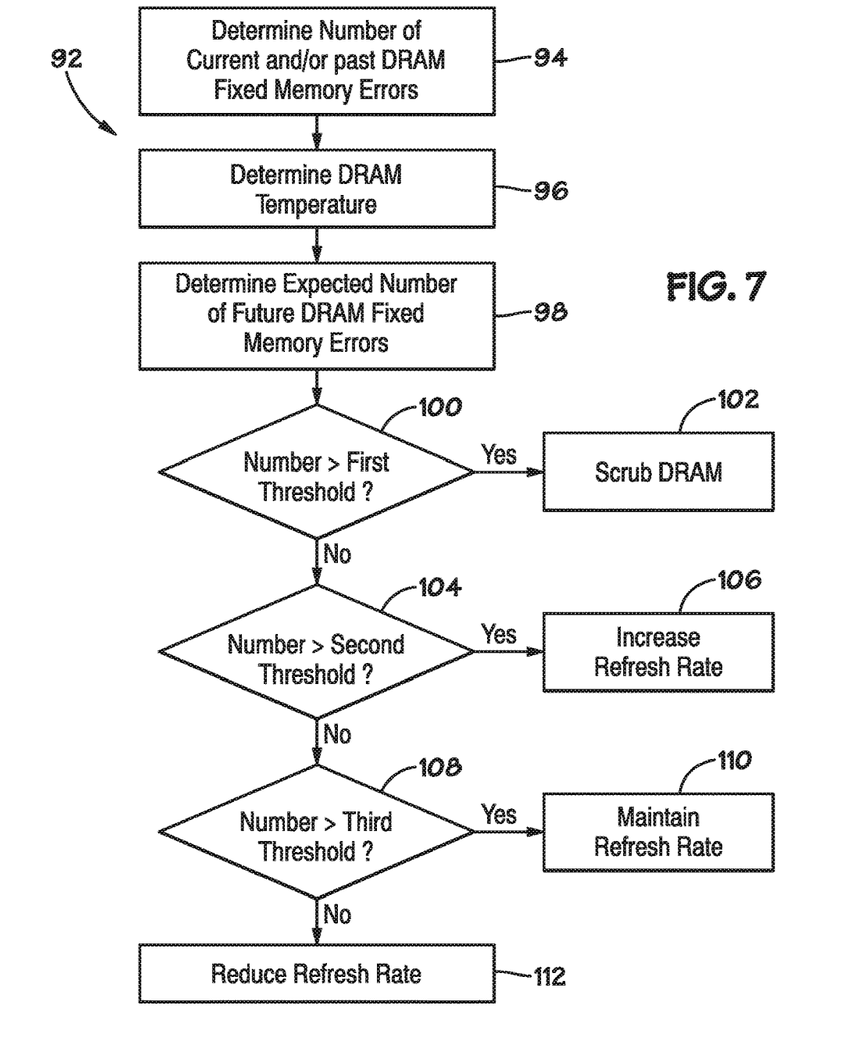
FIG. 7 is a flow diagram of one example of the process of FIG. 6, in accordance with an embodiment.

One illustrative example of the process 78 for determining the refresh rate of a memory device 26 is described in process 92 of FIG. 7 with regard to dynamic random access memory (DRAM). Generally, the process 92 includes determining number of current and/or past fixed memory errors in data read from DRAM (process block 94), determining temperature of the DRAM (process block 96), determining expected number of fixed memory errors in data subsequently read from the DRAM (process block 98), determining whether the expected number is greater than a first error threshold (decision block 100), scrubbing the DRAM when the expected number is greater than the first error threshold (process block 102), determining whether the expected number is greater than a second error threshold when the expected number is not greater than the first error threshold (decision block 104), increasing refresh rate when the expected number is greater than the second error threshold (process block 106), determining whether the expected number is greater than a third error threshold when the expected number is not greater than the second error threshold (decision block 108), maintaining a current refresh rate when the expected number is greater than the third error threshold (process block 110), and reducing refresh rate when the expected number is not greater than the third error threshold (process block 112). In some embodiments, the process 92 may be implemented by executing instructions stored in a tangible non-transitory computer-readable mediums, such as the memory device 26, using processing circuitry, such as the processing device 28.

Accordingly, in some embodiments, the control system 12 may determine number of DRAM fixed memory errors occurring in output data currently received and/or number of DRAM fixed memory errors occurring in output data previously received from the DRAM (process block 94). As described above, the error parameters may include number of each type of error occurring in output data and, thus, number of DRAM fixed memory errors. In other words, in some embodiments, the control system 12 may determine number of DRAM fixed errors based at least in part on the error parameters stored in the error log 36. As such, the control system 12 may retrieve error parameter entries in the error log 36 corresponding with currently received output data and/or previously received output data.

Additionally, the control system 12 may determine temperature of the DRAM (process block 96). In some embodiments, the control system 12 may determine temperature of the DRAM based on sensor data measured by one or more sensors 20. For example, in some embodiments, a temperature sensor 20 may directly measure temperature of the DRAM and communicate the measured temperature to the control system 12. In other embodiments, a temperature sensor 20 may measure temperature of surrounding component and/or the environment and communicate the measured temperature to the control system 12, thereby enabling the control system 12 to indirectly determine (e.g., calculate) temperature of the DRAM. Additionally, in some embodiments, the control system 12 may also determine previous temperature of the DRAM, which may facilitate determining trends in DRAM temperature and/or predict future temperature of the DRAM.

Furthermore, the control system 12 may determine number of DRAM fixed memory errors expected to occur in subsequent output data received from the memory device 26 (process block 98). In some embodiments, the control system 12 may determine the expected number of DRAM fixed memory errors based at least in part on the error parameters and/or system parameters, which may include the number of DRAM fixed memory errors detected in current output data, number of DRAM fixed memory errors detected in previous output data, current temperature of the DRAM, previous temperature of the DRAM, and/or expected temperature of the DRAM when subsequent output data is received. To facilitate, the control system 12 may utilize a model that describes relationship between the expected number of DRAM fixed memory errors, the error parameters, and the system parameters. For example, the model may extrapolate a trend in number of DRAM fixed memory errors and adjust the trend based on expected temperature of the DRAM (e.g., increasing trend when expected temperature increases and decreasing trend when expected temperature decreases).

Additionally, the control system 12 may determine whether the expected number of DRAM fixed memory errors is greater than a first error threshold (decision block 100), greater than a second error threshold (decision block 104), and/or greater than a third error threshold (decision block 108). With regard to the described embodiment, the first error threshold may be greater than the second error threshold and the second error threshold may be greater than the third error threshold. It should be appreciated that although only three error thresholds are described, in other implementations, any suitable number of error thresholds may be utilized.

In some embodiments, the error thresholds may be stored in the memory device 26. Additionally, in some embodiments, values of the error thresholds may be set based at least in part on error correction capabilities of the error correction process 34 and/or total number of memory errors (e.g., soft-bit memory error, fixed memory error, and system memory error) expected to occur in output data subsequently received from the memory device 26.

Specifically, the first error threshold may be set such that control system 12 is expected to be able to scrub at least a portion of the DRAM when the expected number of DRAM fixed memory errors is greater than the first error threshold (process block 102). In some embodiments, the control system 12 may scrub the DRAM by instructing the memory device 26 to output data to the processing device 28, the processing device 28 to perform the error detection process 32, the processing device 28 to perform the error correction process 34, and the memory device 26 to store the error-corrected data.

Since other types of memory errors may also be present, to improve likelihood that the error correction process 34 is sufficiently capable of correcting the memory errors during scrubbing, the first error threshold may be set at a value less than the error correction capabilities of the error correction process 34. In other words, the value of the first error threshold may be adjusted such that total number of memory errors is expected to less than or equal to the error correction capabilities of the error correction process 34 when exceeded by the expected number of DRAM fixed memory errors. Additionally, in some embodiments, the value of the first threshold may be adjusted based at least in part on uncertainty in the expected number of DRAM fixed memory error and/or expected total number of memory errors. For example, the first error threshold may be set lower when uncertainty increases to improve likelihood that the error correction process 34 is capable of correcting each of the memory errors during scrubbing.

Since scrubbing may reduce availability of the DRAM, the second error threshold may be set such that the control system 12 attempts to reduce number of memory errors by increasing refresh rate of the DRAM before resorting to scrubbing (process block 106). Accordingly, the second error threshold may be set at a value less than the first error threshold. As described above, storage capacitors may gradually reduce stored voltage over time, which may result in fixed memory errors. Accordingly, increasing refresh rate may reduce duration the stored voltage is allowed to decrease, thereby reducing likelihood and/or number of fixed memory errors occurring.

In some embodiments, when the expected number of DRAM fixed memory errors is greater than the second error threshold, the control system 12 may increase the refresh rate of the DRAM by a set increment (e.g., duration between refreshes by 8 ms). For example, the control system 12 may increase the refresh rate such that duration between DRAM refreshes reduces from once every 64 ms to once every 56 ms, from once every 56 ms to once every 48 ms, from once every 48 ms to once every 40 ms, from one every 40 ms to once every 32 ms, and so on. Thus, such embodiments may iteratively increase until the refresh rate sufficiently reduces expected number of DRAM fixed memory errors and, thus, total memory errors.

In other embodiments, the control system 12 may increase the refresh rate by varying (e.g., custom) increments. In such embodiments, the control system 12 may determine a refresh rate expected to sufficiently reduce number of DRAM fixed errors and, thus, total memory errors. For example, when the control system 12 determines that refreshing once every 60 ms is expected to be sufficient, the control system 12 may increase the refresh rate such that duration between DRAM refreshes reduces from 64 ms to 60 ms, which may facilitate reducing power consumption and/or increasing DRAM availability compared to increasing the refresh rate such that duration between DRAM refreshes is 56 ms. Additionally, when the control system 12 determines that refreshing once every 32 ms is expected to be sufficient, the control system 12 may increase refresh rate such that duration between DRAM refreshes reduces from 64 ms directly to 32 ms, which, compared to iterative increments, may facilitate reducing duration refreshing the DRAM insufficiently supplements the error correction process 34.

In some embodiments, to facilitate determining the refresh rate expected to be sufficient, the control system 12 may utilize a model describing relationship between refresh rate, environmental conditions, number of fixed memory errors, and/or total number of memory errors. Additionally or alternatively, in some embodiments, the control system 12 may utilize additional error thresholds between the first error threshold and the second error threshold. In such embodiments, each of the additional error thresholds may correspond with a different amount of increase in the refresh rate and/or different higher refresh rates. As such, the control system 12 may determine an amount to increase the refresh rate by comparing the expected number with each of the additional error thresholds.

As described above, since a higher refresh rate may also increase power consumption and/or reduce availability, the third error threshold may be set such that the control system 12 attempts to reduce refresh rate (process block 112) or at least maintain refresh rate (process block 110) when possible. Accordingly, the third error threshold may be set at a value less than the second error threshold. In some embodiments, when the expected number of DRAM fixed memory errors is not greater than the third error threshold, the control system 12 may reduce the refresh rate of the DRAM by a set increment (e.g., duration between refreshes by 8 ms). For example, the control system 12 may decrease the refresh rate such that duration between DRAM refreshes increases from once every 64 ms to once every 72 ms, from once every 72 ms to once every 80 ms, from once every 80 ms to once every 88 ms, from one every 88 ms to once every 96 ms, and so on. Thus, such embodiments may iteratively reduce the refresh rate while expected number of DRAM fixed memory errors and, thus, total memory errors remain acceptable.

In other embodiments, the control system 12 may decrease the refresh rate by varying (e.g., custom) increments. In such embodiments, the control system 12 may determine a refresh rate expected to sufficiently reduce number of DRAM fixed errors and, thus, total memory errors. For example, when the control system 12 determines that refreshing once every 80 ms is expected to be sufficient, the control system 12 may decrease the refresh rate such that duration between DRAM refreshes increases from 64 ms to 80 ms, which may facilitate reducing power consumption and/or increasing DRAM availability compared to decreasing the refresh rate such that duration between DRAM refreshes is 72 ms. Additionally, when the control system 12 determines that refreshing once every 128 ms is expected to be sufficient, the control system 12 may increase refresh rate such that duration between DRAM refreshes increase from 64 ms directly to 128 ms, which, compared to iterative decrements, may reduce duration the DRAM is refreshed at higher refresh rates and, thus, facilitate reducing power consumption and/or increasing DRAM availability.

In some embodiments, to facilitate determining the refresh rate expected to be sufficient, the control system 12 may utilize a model describing relationship between refresh rate, environmental conditions, number of fixed memory errors, and/or total number of memory errors. Additionally or alternatively, in some embodiments, the control system 12 may utilize additional error thresholds between the second error threshold and the third error threshold. In such embodiments, each of the additional error thresholds may correspond with a different amount of decrease in the refresh rate and/or different lower refresh rates. As such, the control system 12 may determine the amount to decrease the refresh rate by comparing the expected number with each of the additional error thresholds.

In this manner, enabling the refresh rate to be increased and/or decreased by varying amounts may facilitate further improving operational reliability and/or operational efficiency of the control system 12 and/or the automation system 10. Moreover, in some embodiments, the refresh rate of the memory device 26 may be adjusted to reduce impact on availability and, thus, operational reliability.

Figure 8:
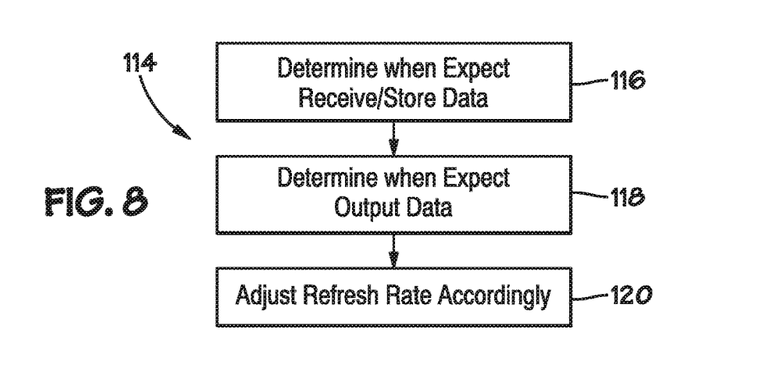
FIG. 8 is a flow diagram of a process for determining a custom refresh rate, in accordance with an embodiment.

To help illustrate, one embodiment of a process 114 for determining refresh rate of a memory device 26 to reduce impact on availability is described in FIG. 8. Generally, the process 114 includes determining when data is expected to be received by a memory device (process block 116), determining when the memory device is expected to output data (process block 118), and adjusting the refresh rate accordingly (process block 120). In some embodiments, the process 114 may be implemented by executing instructions stored in a tangible non-transitory computer-readable mediums, such as the memory device 26, using processing circuitry, such as the processing device 28.

Accordingly, in some embodiments, the control system 12 may determine when the memory device 26 is expected to receive and, thus, store data (process block 116). As described above, the memory device 26 may store data received from one or more input devices 14, the external communication network 18, and/or one or more sensors 20. In some embodiments, the memory device 26 may receive and store data on a relatively periodic basis (e.g., at predefined times). Additionally, in some embodiments, the memory device 26 may be unable to simultaneously refresh and store newly received data, thereby delaying either the refresh, which may increase likelihood and/or number of fixed memory errors, or the storage of the newly received data, which may delay operation of the control system 12.

The control system 12 may also determine when the memory device 26 is expected to output data, for example, to the processing device 28 (process block 118). As described above, the processing device 28 may facilitate controlling operation of the automation system 10 by processing output data receive from the memory device 26. In some embodiments, the memory device 26 may output data on a relatively periodic basis (e.g., at predefined times). Additionally, in some embodiments, the memory device 26 may be unable to simultaneously refresh and output data, thereby delaying either the refresh, which may increase likelihood and/or number of fixed memory errors, or the output of data, which may delay operation of the control system 12.

Thus, in some embodiments, the control system 12 may adjust refresh rate based at least in part on when the memory device 26 is expected to receive data and/or when the memory device 26 is expected to output data (process block 120). For example, the control system 12 may adjust the refresh rate to reduce the duration a refresh overlaps with when data is expected to be received and/or when data is expected to be output. By adjusting the refresh rate in this manner, availability of the memory device 26 may be skewed such that likelihood of availability affecting operation of the control system 12 and/or the automation system 10 may be reduced, which may be particularly useful when availability is reduced by increasing refresh rate.

Technical effects of the present disclosure include improving operational reliability and/or operational efficiency of an automation system by adaptively adjusting refresh rate of a memory device used in the automation system. In some embodiments, a control system may adaptively adjust refresh rate of the memory device based at least in part on correctability (e.g., number) of memory errors expected to occur in output data from the memory device. For example, when not expected to be correctable, the control system may increase the refresh rate of the memory device, which may facilitate reducing likelihood and/or number of memory errors in the output data. On the other hand, when expected to be correctable, the control system may decrease the refresh rate of the memory device, which may facilitate increasing availability of the memory device and/or reducing power consumption. In other words, by adaptively adjusting refresh rate of the memory device, the control system may reduce likelihood of memory errors affecting operation while increasing availability of the memory device, thereby facilitating improved operational reliability of the control system and/or the automation system. Additionally, by adaptively adjusting refresh rate of the memory device, the control system may reduce power consumption, thereby facilitating improved operational efficiency of the control system and/or the automation system.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

What is claimed is:

1. An automation system comprising:
volatile dynamic random access memory;
a sensor; and
a control system communicatively coupled to the sensor wherein the control system is configured to:
receive a first indication of a first temperature of the volatile dynamic random access memory at a first time;
receive first data read from the volatile dynamic random access memory at the first time;
receive a second indication of a second temperature of the volatile dynamic random access memory at a current time, wherein the first time occurred before the current time, and wherein the second temperature is a current temperature;
receive second data read from the volatile dynamic random access memory at the current time;
determine a first number of memory errors occurring in the first data;
determine a second number of memory errors occurring in the second data;
determine a temperature trend based at least in part on the first temperature and the second temperature;
determine an error trend based at least in part on the first number of memory errors and the second number of memory errors;
determine an expected number of memory errors associated with third data to be read at a future time based at least in part on the error trend and the temperature trend; and
adaptively adjust a refresh rate of the volatile dynamic random access memory based at least in part on the expected number of memory errors.

2. The automation system of claim 1, comprising:
an electrical energy source electrically coupled to the control system, wherein the electrical energy source is configured to supply electrical power to the control system;
a braking system communicatively coupled to the control system, wherein the braking system comprises a first actuator configured to reduce movement speed of the automation system when actuated;
a mechanical energy source communicatively coupled to the control system, wherein the mechanical energy source comprises a second actuator configured to increase the movement speed of the automation system when actuated; and
a steering system communicatively coupled to the control system, wherein the steering system comprises a third actuator configured to adjust movement direction of the automation system when actuated;
wherein the control system is configured to autonomously instruct the first actuator, the second actuator, the third actuator, or any combination thereof to actuate based at least in part on a measurement of an additional sensor.

3. The automation system of claim 1, wherein, to adaptively adjust the refresh rate, the control system is configured to:
determine whether the control system is expected to be capable of correcting each of second memory errors occurring in the second data output from the volatile dynamic random access memory based at least in part on first error parameters, system parameters, or both;
increase the refresh rate when the control system is not expected to be capable of correcting each of the second memory errors reduce a likelihood of memory errors occurring in the second data; and
decrease the refresh rate when the control system is expected to be capable of correcting each of the second memory errors to facilitate reducing power consumption of the automation system, increasing bandwidth of the volatile dynamic random access memory, or both.

4. The automation system of claim 1, wherein the control system is configured to:
adaptively adjust the refresh rate used to refresh stored data in the volatile dynamic random access memory at least in part by:
increasing the refresh rate of the volatile dynamic random access memory when the expected number of memory errors associated with the third data is greater than a second error threshold, wherein the second error threshold is less than the first error threshold;
maintaining the refresh rate of the volatile dynamic random access memory when the expected number of memory errors associated with the third data is less than the second error threshold and greater than a third error threshold, wherein the third error threshold is less than the second error threshold; and
decreasing the refresh rate of the volatile dynamic random access memory when the expected number of memory errors associated with the third data is less than the third error threshold.

5. The automation system of claim 1, wherein the control system is configured to:
determine the first number of memory errors based at least in part on error check data output from the volatile dynamic random access memory along with the first data, wherein the error check data comprises a repetition of the first data, a parity bit, checksum bits, cyclic redundancy bits, a hash value, or any combination thereof.

6. The automation system of claim 1, wherein the control system is configured to:
determine when the volatile dynamic random access memory is expected to receive data;
determine when the volatile dynamic random access memory is expected to output data; and
adaptively adjust the refresh rate used to refresh stored data in the volatile dynamic random access memory to reduce overlap duration between when the volatile dynamic random access memory refreshes, when the volatile dynamic random access memory is expected to receive data, and when the volatile dynamic random access memory is expected to output data.

7. The automation system of claim 1, wherein the control system is configured to store an indication of the first number of memory errors in an error log external from the volatile dynamic random access memory.

8. The automation system of claim 1, wherein the control system is configured to determine the first number of memory errors based at least in part on an error parameter, wherein the error parameter comprises an indication of a location of each of the memory errors in the first data, an error type of each of the memory errors in the first data, or both.

9. The automation system of claim 1, wherein the automation system comprises a manufacturing system, a turbine system, one or more machines, a factory, a plant, an airplane, an automotive vehicle, or any combination thereof.

10. A method for operating a control system of an automation system, comprising:
refreshing volatile memory implemented in the control system using a first refresh rate;
receiving a first temperature of the volatile memory at a first time;
receiving first data read from the volatile memory at the first time;
receiving a second indication of a second temperature of the volatile memory at a current time, wherein the first time occurred before the current time, and wherein the second temperature is a current temperature;
receiving second data read from the volatile memory at the current time;
determining a first number of memory errors occurring in the first data;
determining a second number of memory errors occurring in the second data;
determining an error trend based at least in part on the first number of memory errors and the second number of memory errors;
determining a temperature trend based at least in part on the first temperature and the second temperature;
determining an expected number of memory errors associated with third data to be read at a future time based at least in part on the temperature trend and the error trend; and
transmitting an instruction to cause refresh of the volatile memory using a second refresh rate based at least in part on the expected number of memory errors.

11. The method of claim 10, wherein:
the second refresh rate is higher than the first refresh rate to facilitate reducing memory errors occurring in subsequent data output from the volatile memory after the first data when the control system determines that an error correction process is not expected to be capable of sufficiently correcting the expected number of memory errors to meet an operational reliability standard; and
the second refresh rate is lower than the first refresh rate to facilitate reducing power consumption of the automation system, increasing availability of the volatile memory to store data, increasing availability of the volatile memory to output data, or any combination thereof when the control system determines that the error correction process is expected to be capable of sufficiently correcting the expected number of memory errors to meet the operational reliability standard.

12. The method of claim 10, wherein determining the first number of memory errors is based at least in part on error check data.

13. The method of claim 10, wherein determining the first number of memory errors is based at least in part on performing a hash function on the first data.

14. The method of claim 10, wherein transmitting the instruction is based at least in part on comparing the expected number of memory errors with one or more error thresholds.

15. The method of claim 10, wherein:
refreshing the volatile memory comprises refreshing stored data using the first refresh rate at least in part by periodically reading the stored data from the volatile memory and storing values indicated by the stored data back into the volatile memory based at least in part on a first duration.

16. A control system configured to control operation of an automation system, comprising:
a memory device comprising volatile memory; and
a processing device communicatively coupled to the memory device, wherein the processing device is configured to:
receive a first indication of a first temperature of the volatile memory at a first time;
receive first data read from the volatile memory at the first time;
receive a second indication of a second temperature of the volatile memory at a current time, wherein the first time occurred before the current time, and wherein the second temperature is a current temperature;
receive second data read from the volatile memory at the current time;
determine a first number of memory errors occurring in the first data;
determine a second number of memory errors occurring in the second data;
determine a temperature trend based at least in part on the first temperature and the second temperature;
determine an error trend based at least in part on the first number of memory errors and the second number of memory errors;
determine an expected number of memory errors associated with third data to be read at a future time based at least in part on the error trend and the temperature trend; and
adaptively adjust a refresh rate of the volatile memory based at least in part on the expected number of memory errors.

17. The control system of claim 16, wherein the processing device is configured to:
determine whether an error correction process is expected to be sufficiently capable of correcting the expected number of memory errors to meet a reliability standard governing operation of the control system, the automation system, or both; and
adaptively adjust the refresh rate of the volatile memory at least in part by:
instructing the memory device to increase the refresh rate of the volatile memory when the error correction process is not expected to be sufficiently capable of correcting the expected number of memory errors; and
instruct the memory device to decrease the refresh rate of the volatile memory when the error correction process is expected to be sufficiently capable of correcting the expected number of memory errors.

18. The control system of claim 16, wherein, to adaptively adjust the refresh rate, the processing device is configured to:
instruct the memory device to increase the refresh rate of the volatile memory when the expected number of memory errors is greater than a first error threshold;
instruct the memory device to maintain the refresh rate of the volatile memory when the expected number of memory errors is less than the first error threshold and greater than a second error threshold, wherein the second error threshold is configured to be less than the first error threshold; and instruct the memory device to decrease the refresh rate of the volatile memory when the expected number of memory errors is less than the second error threshold.

19. The control system of claim 16, wherein the volatile memory implemented in the memory device comprises one or more storage capacitors, wherein each of the one or more storage capacitors is configured to:

store a voltage that indicates a value of a bit of the first data; and gradually reduce magnitude of the voltage over time between refreshes.

20. The control system of claim 16, wherein:

the memory device is configured to:

determine error check data based at least in part on the first data, wherein the error check data comprises a copy of the first data, a result of a hash function performed on the first data, or both; and output the second data to the processing device by outputting the first data along with the error check data; and the processing device is configured to:

perform an error detection process at least in part by:
determining the error check data from the second data and
determining a location of each of the memory errors in the first data based at least in part on the error check data; and perform an error correction process at least in part by flipping a value of a data bit corresponding with each location of the memory errors in the first data.

21. The control system of claim 16, comprising one or more input/output ports configured to communicatively couple the control system to one or more input devices, one or more output device, an external communication network, one or more sensors, one or more actuators, or any combination thereof, wherein:

the memory device is configured to store operational parameters determined by the one or more sensors, user inputs received via the one or more inputs devices, instructions executable by the processing device, or any combination thereof; and the processing device is configured to control operation of the automation system by communicating control commands instructing the one or more actuators to perform control actions.

22. The control system of claim 16, wherein:

the processing device is configured to store an indication of the first number of memory errors, of the second number of memory errors, or both in an error log separate from the memory device; and the memory device comprises dynamic random access memory.

23. A tangible, non-transitory, computer-readable medium that stores instructions executable by one or more processors in an automation system comprising volatile memory, wherein the instructions comprise instructions to:

receive, using the one or more processors, a first indication of a first temperature of the volatile memory at a first time;

receive, using the one or more processors, first data read from the volatile memory at the first time;

receive, using the one or more processors, a second indication of a second temperature of the volatile memory at a current time, wherein the first time occurred before the current time, and wherein the second temperature is a current temperature;

receive, using the one or more processors, second data read from the volatile memory at the current time;

determine, using the one or more processors, a first number of memory errors occurring in the first data;

determine, using the one or more processors, a second number of memory errors occurring in the second data;

determine, using the one or more processors, a temperature trend based at least in part on the first temperature and the second temperature;

determine, using the one or more processors, an error trend based at least in part on the first number of memory errors and the second number of memory errors;

determine, using the one or more processors, an expected number of memory errors associated with third data to be read at a future time based at least in part on the error trend and the temperature trend;

adaptively adjust, using the one or more processors, a refresh rate of the volatile memory based at least in part on the expected number of memory errors; and send, using the one or more processors, a control signal to the volatile memory to cause a refresh of the volatile memory according to the refresh rate.

24. The tangible, non-transitory, computer-readable medium of claim 23, comprising instructions to:

determine, using the one or more processors, a control command by processing the first data after an error correction process is performed; and instruct, using the one or more processors, an actuator in the automation system to perform a control action by communicating the control command to the actuator.

25. The tangible, non-transitory, computer-readable medium of claim 23, wherein the instructions to determine the expected number of memory errors comprise instructions to:

predict, using the one or more processors, a subsequent temperature of the volatile memory based at least in part on the temperature trend; and determine, using the one or more processors, the expected number of memory errors based at least in part on the subsequent temperature.

26. The tangible, non-transitory, computer-readable medium of claim 23, wherein the instructions to adaptively adjust the refresh rate comprise instructions to:

set, using the one or more processors, the refresh rate of the volatile memory at a first value when the expected number of memory errors is greater than an error threshold; and set, using the one or more processors, the refresh rate of the volatile memory at a second value less than the first value when the expected number of memory errors less than the error threshold.

27. The tangible, non-transitory, computer-readable medium of claim 23, wherein:

the instructions to execute an error detection process comprise instructions to:

receive error check data corresponding with the first data from the volatile memory, wherein the error check data comprises a repetition of the first data received in series or parallel with the first data; and compare the first data with the repetition to determine data bits in the first data affected by one of the first number of memory errors; and adjust a value of each of the affected data bits in the first data.

28. The tangible, non-transitory, computer-readable medium of claim 23, wherein:
   the instructions to execute an error detection process comprise instructions to:
   receive error check data corresponding with the first data from the volatile memory, wherein the error check data comprises a first result of a hash function performed on the first data;
   perform the hash function on the first data to determine a second result; and
   compare the first result and the second result to determine data bits in the first data affected by the first number of memory errors; and
   adjust a value of each of the affected data bits.

29. The tangible, non-transitory, computer-readable medium of claim 23, wherein the volatile memory comprises dynamic random access memory.

* * * * *